(12) United States Patent
Samudrala et al.

(10) Patent No.: US 9,742,884 B2
(45) Date of Patent: *Aug. 22, 2017

(54) RETRY MECHANISM FOR DATA LOADING FROM ON-PREMISE DATASOURCE TO CLOUD

(71) Applicant: SAP SE, Walldorf (DE)

(72) Inventors: Anil Samudrala, Newark, CA (US); Wu Cao, Redwood City, CA (US); Vikram Kunniyur, Santa Clara, CA (US); YunKei Tsang, Cupertino, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/079,460

(22) Filed: Mar. 24, 2016

(65) Prior Publication Data

US 2016/0212248 A1    Jul. 21, 2016

Related U.S. Application Data

(63) Continuation of application No. 13/715,956, filed on Dec. 14, 2012, now Pat. No. 9,307,059.

(60) Provisional application No. 61/724,544, filed on Nov. 9, 2012.

(51) Int. Cl.
*G06F 15/16* (2006.01)
*H04L 29/14* (2006.01)
*G06F 17/30* (2006.01)
*H04L 29/08* (2006.01)

(52) U.S. Cl.
CPC .............. *H04L 69/40* (2013.01); *G06F 17/30* (2013.01); *H04L 67/10* (2013.01)

(58) Field of Classification Search
CPC ..... H04L 69/40; H04L 67/1096; H04L 67/10; G06F 17/30
USPC .................................................. 709/203, 223
See application file for complete search history.

(56) References Cited

U.S. PATENT DOCUMENTS

| 6,678,701 | B1 | 1/2004 | Garth et al. |
| 7,136,857 | B2 * | 11/2006 | Chen ..................... G06F 8/60 |
| 7,181,731 | B2 * | 2/2007 | Pace ....................... G06F 8/60 |
| | | | 707/999.01 |

(Continued)

OTHER PUBLICATIONS

"U.S. Appl. No. 13/715,956, Non Final Office Action mailed Oct. 6, 2015", 13 pgs.

(Continued)

*Primary Examiner* — Krista Zele
*Assistant Examiner* — Michael A Chambers
(74) *Attorney, Agent, or Firm* — Schwegman Lundberg & Woessner, P.A.

(57) ABSTRACT

A method and system of retrying to load data from a data source to a cloud target system are disclosed. A server receives a first data packet from a device via a communication network. The first data packet comprises first data. The server stores the first data in one or more databases. The server receives a second data packet from the device. The second data packet comprises second data and is marked with a retry flag. The server determines that the second data packet has been marked with the retry flag, and performs an upsert operation with the second data in the second data packet based on the determining that the second data packet has been marked with the retry flag.

17 Claims, 5 Drawing Sheets

(56) References Cited

U.S. PATENT DOCUMENTS

| | | |
|---|---|---|
| 7,209,925 B2 | 4/2007 | Srinivasan et al. |
| 7,251,650 B2 | 7/2007 | Jin et al. |
| 7,373,357 B2 | 5/2008 | Iyer et al. |
| 7,552,135 B2 | 6/2009 | Iyer et al. |
| 7,769,789 B2 | 8/2010 | Hoang et al. |
| 7,984,019 B2 | 7/2011 | Boyko et al. |
| 8,103,906 B1 * | 1/2012 | Alibakhsh ............... H04L 67/42 714/13 |
| 8,117,184 B2 | 2/2012 | Iyer et al. |
| 8,402,061 B1 | 3/2013 | Briggs et al. |
| 8,510,304 B1 | 8/2013 | Briggs et al. |
| 8,510,344 B1 | 8/2013 | Briggs et al. |
| 8,510,835 B1 | 8/2013 | Bucu et al. |
| 8,560,568 B2 | 10/2013 | Gilder et al. |
| 8,688,666 B1 * | 4/2014 | Briggs ............. G06F 17/30318 707/705 |
| 8,711,861 B2 * | 4/2014 | Goyal .................... G06N 5/02 370/392 |
| 8,726,343 B1 * | 5/2014 | Borzycki ........... G06F 21/6218 709/203 |
| 8,769,060 B2 | 7/2014 | Avirneni et al. |
| 8,798,051 B2 * | 8/2014 | Okuno ............... H04L 67/2828 340/500 |
| 8,799,360 B2 | 8/2014 | Nicholson et al. |
| 8,856,089 B1 | 10/2014 | Briggs et al. |
| 8,984,336 B1 | 3/2015 | Das |
| 9,307,059 B2 | 4/2016 | Samudrala et al. |
| 2003/0061225 A1 | 3/2003 | Bowman et al. |
| 2003/0061226 A1 | 3/2003 | Bowman et al. |
| 2003/0195942 A1 * | 10/2003 | Muhlestein ............. H04L 63/10 709/215 |
| 2005/0049996 A1 | 3/2005 | Srinivasan et al. |
| 2005/0050083 A1 | 3/2005 | Jin et al. |
| 2007/0174429 A1 * | 7/2007 | Mazzaferri ........... G06F 3/1415 709/218 |
| 2007/0192336 A1 * | 8/2007 | Iyer ................... G06F 17/30463 |
| 2008/0082632 A1 * | 4/2008 | Inagaki ................ H04L 1/1835 709/219 |
| 2008/0172679 A1 * | 7/2008 | Shen ....................... H04L 69/40 719/318 |
| 2008/0294613 A1 | 11/2008 | Iyer et al. |
| 2009/0172047 A1 | 7/2009 | Boyko et al. |
| 2010/0030880 A1 * | 2/2010 | Joshi .................. H04L 67/1095 709/223 |
| 2010/0179940 A1 | 7/2010 | Gilder et al. |
| 2010/0228819 A1 * | 9/2010 | Wei ......................... G06F 9/505 709/203 |
| 2011/0022574 A1 | 1/2011 | Hansen |
| 2011/0225231 A1 * | 9/2011 | Bansal ................ H04L 12/4641 709/203 |
| 2011/0231358 A1 | 9/2011 | Boyko et al. |
| 2011/0252086 A1 * | 10/2011 | Batey ................ G06Q 30/0601 709/203 |
| 2012/0198034 A1 | 8/2012 | Avirneni et al. |
| 2012/0221626 A1 * | 8/2012 | Ferris .................... H04L 67/325 709/203 |
| 2013/0024496 A1 * | 1/2013 | Krishnan ................ G06F 9/505 709/203 |
| 2013/0060838 A1 * | 3/2013 | Yaffe .................... G06F 9/5027 709/203 |
| 2013/0060839 A1 * | 3/2013 | Van Biljon ............ G06Q 30/04 709/203 |
| 2013/0103653 A1 | 4/2013 | Carson et al. |
| 2013/0144939 A1 * | 6/2013 | Prahlad ................... H04L 67/42 709/203 |
| 2013/0198743 A1 * | 8/2013 | Kruglick ............. G06F 9/45533 718/1 |
| 2013/0246513 A1 * | 9/2013 | Zaveri .................... G06F 3/067 709/203 |
| 2013/0275695 A1 * | 10/2013 | Ponsford ............. G06F 11/1448 711/162 |
| 2013/0304798 A1 | 11/2013 | Chang et al. |
| 2014/0006482 A1 * | 1/2014 | Raghu .................... H04L 67/10 709/203 |
| 2014/0032627 A1 | 1/2014 | Lorenz et al. |
| 2014/0032634 A1 | 1/2014 | Pimmel et al. |
| 2014/0032644 A1 * | 1/2014 | Saxena .................. H04L 67/10 709/203 |
| 2014/0108506 A1 * | 4/2014 | Borzycki ................ H04L 67/10 709/203 |
| 2014/0122698 A1 * | 5/2014 | Batrouni .............. H04L 67/2833 709/224 |
| 2014/0122725 A1 * | 5/2014 | Batrouni .............. H04L 67/2842 709/226 |
| 2014/0136593 A1 | 5/2014 | Samudrala et al. |

OTHER PUBLICATIONS

"U.S. Appl. No. 13/715,956, Notice of Allowance mailed Feb. 16, 2016", 10 pgs.

"U.S. Appl. No. 13/715,956, Response filed Jan. 5, 2016 to Non Final Office Action mailed Oct. 6, 2015", 8 pgs.

* cited by examiner

RETRY MECHANISM FOR DATA LOADING FROM ON-PREMISE DATASOURCE TO CLOUD

CROSS-REFERENCE TO RELATED APPLICATIONS

This application is a continuation of prior application Ser. No. 13/715,956, filed on Dec. 14, 2012, and claims priority to U.S. Provisional Application No. 61/724,544, filed on Nov. 9, 2012, and entitled, "RETRY MECHANISM FOR DATA LOADING FROM ON-PREMISE DATASOURCE TO CLOUD," which is hereby incorporated by reference in its entirety as if set forth herein.

TECHNICAL FIELD

The present application relates generally to the technical field of cloud computing, and, in one specific example, to a mechanism for loading data from a data source to a target on a cloud.

BACKGROUND

In certain situations involving cloud computing, data may need to be transferred from a customer data source system to a target on a cloud system. When loading data from an on-premise source to a target on a cloud system, the network connection can be dropped at any time, causing the current data loading job to fail. If the job has to transfer millions of records from the source to the target and the connection is compromised, for example, during the last batch of records, then all of the records need to be transferred again from the source to the target. This method of data loading is inefficient.

BRIEF DESCRIPTION OF THE DRAWINGS

Some embodiments are illustrated by way of example and not limitation in the figures of the accompanying drawings in which.

DETAILED DESCRIPTION

Example methods and systems of retrying to load data from a data source to a cloud target system are described. In the following description, for purposes of explanation, numerous specific details are set forth in order to provide a thorough understanding of example embodiments. It will be evident, however, to one skilled in the art that the present embodiments may be practiced without these specific details.

In some embodiments, a client device sends a data packet to a cloud server via a communication connection. The data packet may comprise data. The client device may receive an indication of a failure in the communication connection. The client device may configure, in response to receiving the indication of the failure in the communication connection, the data packet to prompt the cloud server to perform an upsert operation with the data in the data packet. The client device may send the configured data packet to the cloud server.

An upsert operation either inserts a data record into a database or updates the data record in the database based on whether the data record exists in the database. The upsert operation may determine whether the data record exists in the database. If the data record does not exist in the database, then the upsert operation inserts the data record into the database. If the data record does exist in the database, then the upsert operation updates the existing data record in the database.

In some embodiments, data is retrieved from a source system and arranged (e.g., divided) into a plurality of data packets. The plurality of data packets may comprise the data packet sent to the cloud server. In some embodiments, configuring the data packet to prompt the cloud server to perform an upsert operation comprises marking the data packet with a retry flag. In some embodiments, the client device may wait a predetermined amount of time before sending the configured data packet to the cloud server. In some embodiments, the predetermined amount of time is based on at least one processing time of the cloud server. In some embodiments, the at least one processing time of the cloud server is a processing time of a data loader on the cloud server.

In some embodiments, a system comprises a machine and an agent on the machine. The machine may have at least one processor. The agent may be configured to send a data packet to a cloud server via a communication connection. The data packet may comprise data. The agent may also be configured to receive an indication of a failure in the communication connection. The agent may further be configured to configure, in response to receiving the indication of the failure in the communication connection, the data packet to prompt the cloud server to perform an upsert operation with the data in the data packet, and to send the configured data packet to the cloud server.

Figure 1:
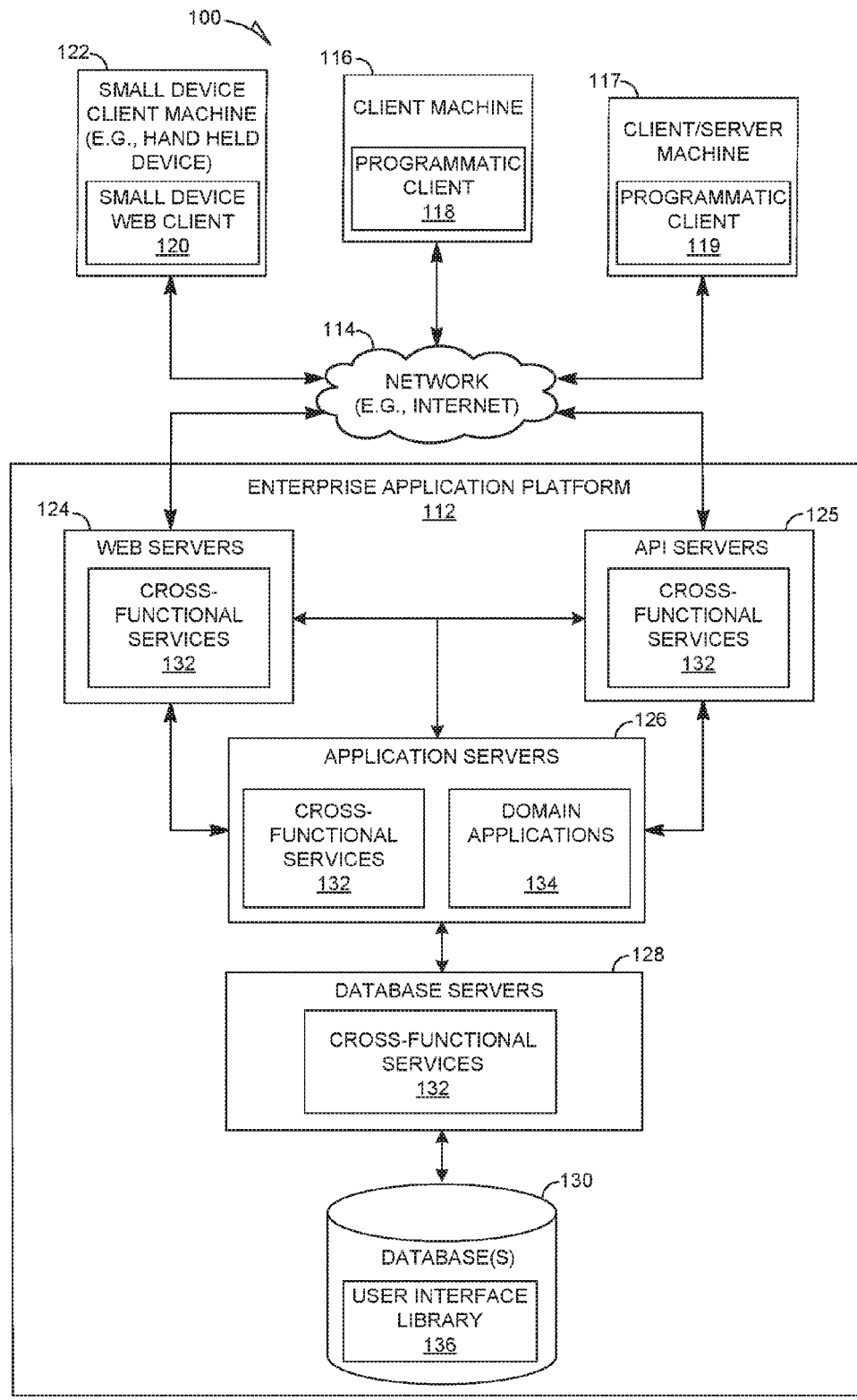
FIG. 1 is a network diagram illustrating a client-server system, within which an example embodiment can be deployed.

FIG. 1 is a network diagram illustrating a client-server system, within which an example embodiment can be deployed. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser, such as the INTERNET EXPLORER browser developed by Microsoft Corporation of Redmond, Wash. State), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 may be coupled to, and provide web and programmatic interfaces to, application servers 126. The application servers 126 may be, in turn, coupled to one or more database servers 128 that facilitate access to one or more databases 130. The web servers 124, Application Program Interface (API) servers 125, application servers 126, and database servers 128 may host cross-functional services 132. The application servers 126 further may host domain applications 134.

The cross-functional services 132 provide services to users and processes that utilize the information enterprise application platform 112. For instance, the cross-functional services 132 may provide portal services (e.g., web services), database services and connectivity to the domain applications 134 for users that operate the client machine 116, the client/server machine 117 and the small device client machine 122. In addition, the cross-functional services 132 may provide an environment for delivering enhancements to existing applications and for integrating third-party and legacy applications with existing cross-functional services 132 and domain applications 134. Further, while the system 100 shown in FIG. 1 employs a client-server architecture, the embodiments of the present invention are of course not limited to such an architecture, and could equally well find application in a distributed, or peer-to-peer, architecture system.

Figure 2:
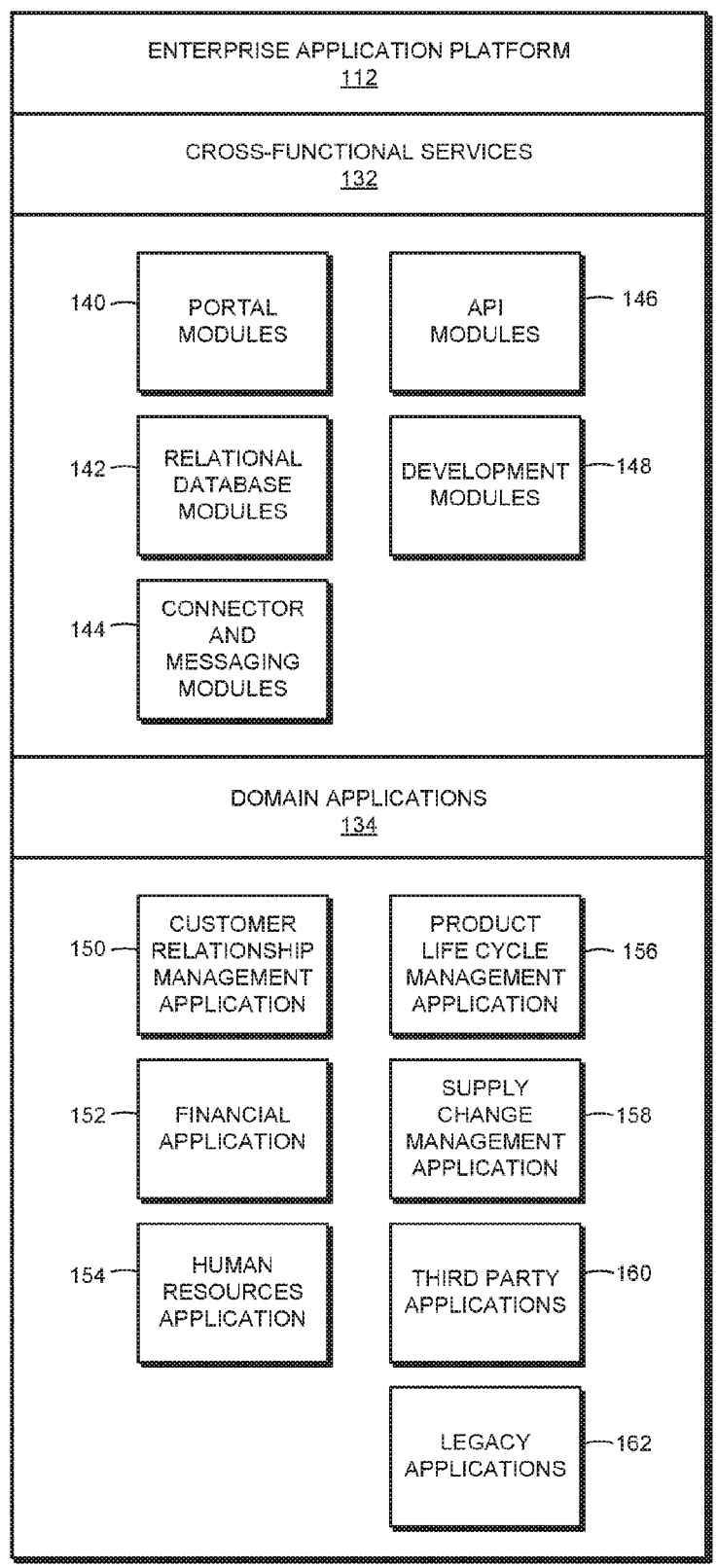
FIG. 2 is a block diagram illustrating example enterprise applications and services in an example enterprise application platform.

FIG. 2 is a block diagram illustrating example enterprise applications and services deployed on the enterprise application platform 112, according to an example embodiment. The enterprise application platform 112 includes cross-functional services 132 and domain applications 134. The cross-functional services 132 may include portal modules 140, relational database modules 142, connector and messaging modules 144, Application Program Interface (API) modules 146, and development modules 148.

The portal modules 140 may enable a single point of access to other cross-functional services 132 and domain applications 134 for the client machine 116, the small device client machine 122 and the client/server machine 117. The portal modules 140 may be utilized to process, author and maintain web pages that present content (e.g., user interface elements and navigational controls) to the user. In addition, the portal modules 140 may enable user roles, a construct that associates a role with a specialized environment that is utilized by a user to execute tasks, utilize services and exchange information with other users and within a defined scope. For example, the role may determine the content that is available to the user and the activities that the user may perform. The portal modules 140 include a generation module, a communication module, a receiving module and a regenerating module. In addition the portal modules 140 may comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 may provide support services for access to the database 130, which includes a user interface library 136. The relational database modules 142 may provide support for object relational mapping, database independence and distributed computing. The relational database modules 142 may be utilized to add, delete, update and manage database elements. In addition, the relational database modules 142 may comply with database standards and/or utilize a variety of database technologies including SQL, SQLDBC, Oracle, MySQL, Unicode, JDBC.

The connector and messaging modules 144 may enable communication across different types of messaging systems that are utilized by the cross-functional services 132 and the domain applications 134 by providing a common messaging application processing interface. The connector and messaging modules 144 may enable asynchronous communication on the enterprise application platform 112.

The Application Program Interface (API) modules 146 may enable the development of service-based applications by exposing an interface to existing and new applications as services. Repositories may be included in the platform as a central place to find available services when building applications.

The development modules 148 may provide a development environment for the addition, integration, updating and extension of software components on the enterprise application platform 112 without impacting existing cross-functional services 132 and domain applications 134.

Turning to the domain applications 134, the customer relationship management application 150 may enable access to and may facilitate collecting and storing of relevant personalized information from multiple data sources and business processes. Enterprise personnel that are tasked with developing a buyer into a long-term customer may utilize the customer relationship management applications 150 to provide assistance to the buyer throughout a customer engagement cycle.

Enterprise personnel may utilize the financial applications 152 and business processes to track and control financial transactions within the enterprise application platform 112. The financial applications 152 may facilitate the execution of operational, analytical and collaborative tasks that are associated with financial management. Specifically, the financial applications 152 may enable the performance of tasks related to financial accountability, planning, forecasting, and managing the cost of finance.

The human resource applications 154 may be utilized by enterprise personnel and business processes to manage, deploy, and track enterprise personnel. Specifically, the human resource applications 154 may enable the analysis of human resource issues and facilitate human resource decisions based on real time information.

The product life cycle management applications 156 may enable the management of a product throughout the life cycle of the product. For example, the product life cycle management applications 156 may enable collaborative engineering, custom product development, project management, asset management and quality management among business partners.

The supply chain management applications 158 may enable monitoring of performances that are observed in supply chains. The supply chain management applications 158 may facilitate adherence to production plans and on-time delivery of products and services.

The third-party applications 160, as well as legacy applications 162, may be integrated with domain applications 134 and utilize cross-functional services 132 on the enterprise application platform 112.

Figure 3:
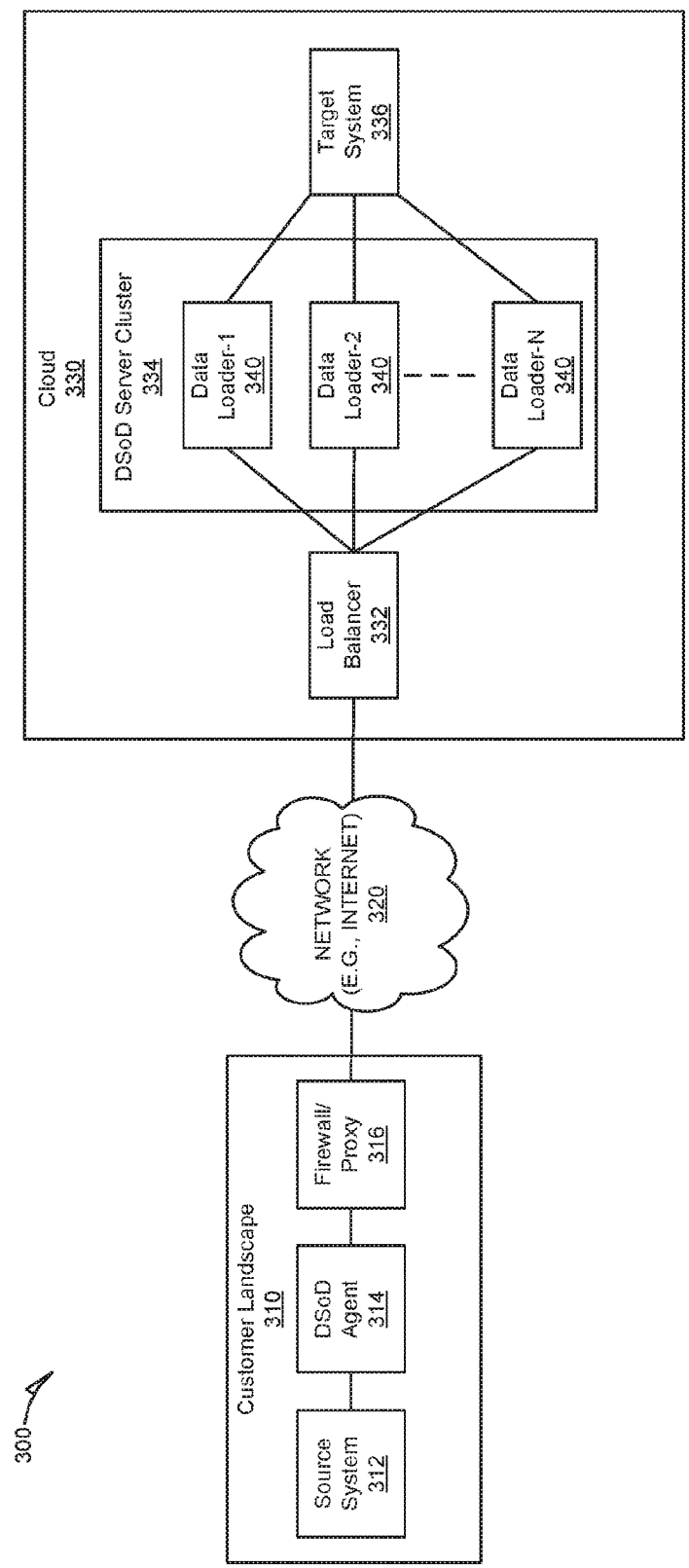
FIG. 3 is a block diagram illustrating an example embodiment of a data loading retry system.

FIG. 3 is a block diagram illustrating an example embodiment of a data loading retry system 300. In some embodiments, the components and features of the data loading retry system 300 discussed below may be incorporated into or implemented using the components and features of system 100 in FIG. 1. In some embodiments, the system 300 is configured to provide data services on-demand (DSoD) functionality. The system 300 may comprise a customer landscape system 310 that communicates with a cloud system 330 via a communication network 320. In some embodiments, the customer landscape system 310 comprises data and the cloud system 330 comprises applications running on a server. The data from the customer landscape system 310 may be transmitted and loaded onto the cloud system 330. In some embodiments, there is a client-server relationship between the customer landscape system 310 and the cloud system 330, with the customer landscape system 310 acting as the client and the cloud system 330 acting as the server.

In some embodiments, the customer landscape system 310 comprises a source system 312 on the premises of the customer. The source system 312 may be configured to store data. In some embodiments, the source system 312 comprises one or more databases in which to store the data.

The customer landscape system 310 may also comprise an agent 314. In some embodiments, the agent 314 is a DSoD agent. The agent 314 may be a tool that is configured to transfer data from the source system 312 to the cloud system 330. In some embodiments, the agent 314 retrieves data from the source system 312, processes (e.g., transforms) the data as specified by a user, and then sends the data to the cloud system 330 via the communication network 320. In some embodiments, the agent 314 arranges the data retrieved from the source system 312 into packets. In some embodiments, the agent 314 arranges the data into data packets of a fixed size. In some embodiments, the agent 314 may arrange the retrieved data into multiple data packets by dividing the retrieved data into multiple data packets. The agent 314 may then send each packet to the cloud system 330.

In some embodiments, a load balancer 332 in the cloud system 330 receives the data packets sent by the agent 314. The load balancer 332 may be configured to manage which data loader 340 to send each data packet to for loading onto a target system 336 on the cloud system 330. In some embodiments, the cloud system 330 comprises a server cluster 334 that may comprise a plurality of data loaders 340, for example, data loader-1, data loader-2, . . . data loader-N. In some embodiments, each data loader 340 runs on the cloud system 330 as a server. The load balancer 332 may be configured to determine which data loader 340 is available or most appropriate for loading the current data packet onto the target system 336. In some embodiments, the target system 336 comprises one or more databases in which to store the data.

In some embodiments, the data packets sent by the agent 314 pass through one or more components before reaching a data loader 340 running on the cloud system 330. Examples of such components include, but are not limited to, an on-premises firewall and proxy, an internet service provider (ISP) firewall, transparent proxies, firewalls on the cloud system 330, a reverse proxy on the cloud system 330, a load balancer on the cloud system 330, and a servlet container (e.g., Apache Tomcat). In some embodiments, the data in the data packet is embedded into an HTTP body to allow the requests to pass through proxies. In FIG. 3, the data packets may be sent through on-premises firewall and proxy 316 before reaching the load balancer 332.

In some embodiments, during operation, the agent 314 arranges the data from the source system 312 into data packets and sends each data packet to the load balancer 332 on the cloud system 330 via the communication network 320. In some embodiments, the agent 314 may arrange the data into data packets by dividing the retrieved data into data packets. In some embodiments, each data packet comprises a request to insert the data in the data packet into the target system 336. The load balancer 332 may then determine which data loader 340 to send the data packet to and send it to that data loader 340. The data loader 340 may then insert the data in the data packet into the target system 336.

In some embodiments, the agent 314 may receive an indication of a failure, or error, in its communication connection with the data loader 340. It is contemplated that this indication of a failure in the communication connection may take many forms. In some embodiments, this indication may be in the form of any type of failure signal. In some embodiments, this indication may be in the form of an absence of an expected signal (e.g., no response) within an expected time period. It is contemplated that other indications of a failure at the communication layer are within the scope of the present disclosure. It is also contemplated that the failure in the communication connection may take on many different forms. In some embodiments, the failure in the communication connection comprises a dropped or broken connection. In some embodiments, the failure in the communication connection comprises a malfunction of the firewall or proxy. It is contemplated that other types of failures in the communication connection are within the scope of the present disclosure. The indication of a failure in the communication connection may come from and be caused by a problem with any intermediate component between the agent 314 and a data loader 340.

In response to receiving an indication of a failure in the communication connection, the agent 314 may determine which data packet was being sent and attempting to be loaded onto the target system 336 when the failure in the communication connection occurred, and then configure a copy of that same data packet to prompt one of the data loaders 340 to perform an upsert operation with the data in the data packet. The agent 314 may then send the configured data packet to one of the data loaders 340 in the server cluster 334, in some embodiments, via the load balancer 332. In some embodiments, configuring the same data packet to prompt one of the data loaders 340 to perform the upsert operation comprises marking the data packet with a retry flag. The retry flag may be any flag that indicates to the data loader 340 that a repeat attempt is being made to load the same data packet onto the target system 336.

For synchronization purposes, the agent 314 may determine an amount of time to wait before resending the same data packet and then wait that determined amount of time before resending the same data packet. Waiting this amount of time allows the data loader 340 to finish processing the current data packet. In some embodiments, this waiting time may be determined based on a maximum response or processing time for the data loaders 340 in the server cluster 334. In some embodiments, this waiting time may be determined based on an average response or processing time for the data loaders 340 in the server cluster 334. In some embodiments, this wait time may be calculated based on history. For example, for each data packet that is sent by the agent 314 to a data loader 340, the agent 314 may find out the response or processing time for that data loader 340, and store that time in its memory. The agent 314 may then calculate the wait time based on this stored history of response/processing times.

The configured data packet may be received by the load balancer 332, and passed on to one of the data loaders 340 in the server cluster 334. In some embodiments, the load balancer 332 may have determined which data loader 340 to send the data packet to based on availability, and may send the data packet to a different data loader 340 than it did before for the same data packet. For example, the load balancer 332 may send a data packet to data loader-1 the first time, but then send the same data packet to data loader-2 the second time during the loading retry.

Upon receiving the configured data packet, the data loader 340 may recognize that the data packet has been configured to prompt one of the data loaders 340 to perform an upsert operation with the data in the data packet. In some embodiments, the data loader 340 can make this recognition via a flag with which the data packet has been marked. The data loader 340 may then perform a database upsert operation on the target system 336, instead of an insert operation, using the data in the data packet.

The use of the upsert operation when retrying to load the data onto the target system 336 is more efficient than using the insert operation again. An insert operation followed by one or more upsert operations of the same data packet on a data set is idempotent. If the first request to load the data was successfully processed by a data loader 340, but the data loader 340 was unable to send a success response to the agent 314 (e.g., because the proxy broke the connection), then the data has already been inserted into the target system 336. Therefore, inserting the data again would not be efficient, as it creates duplicates. Using the upsert operation makes the retry mechanism efficient and idempotent.

In some embodiments, the agent 314 may be configured to determine whether a failure or error is coming from a data loader 340 or from one of the intermediate components (e.g., firewall or proxy) between the agent 314 and the data loader 340. In some embodiments, the agent 314 only configures the data packet for an upsert operation and resends the data packet if the failure or error is coming from one of the intermediate components.

Figure 4:
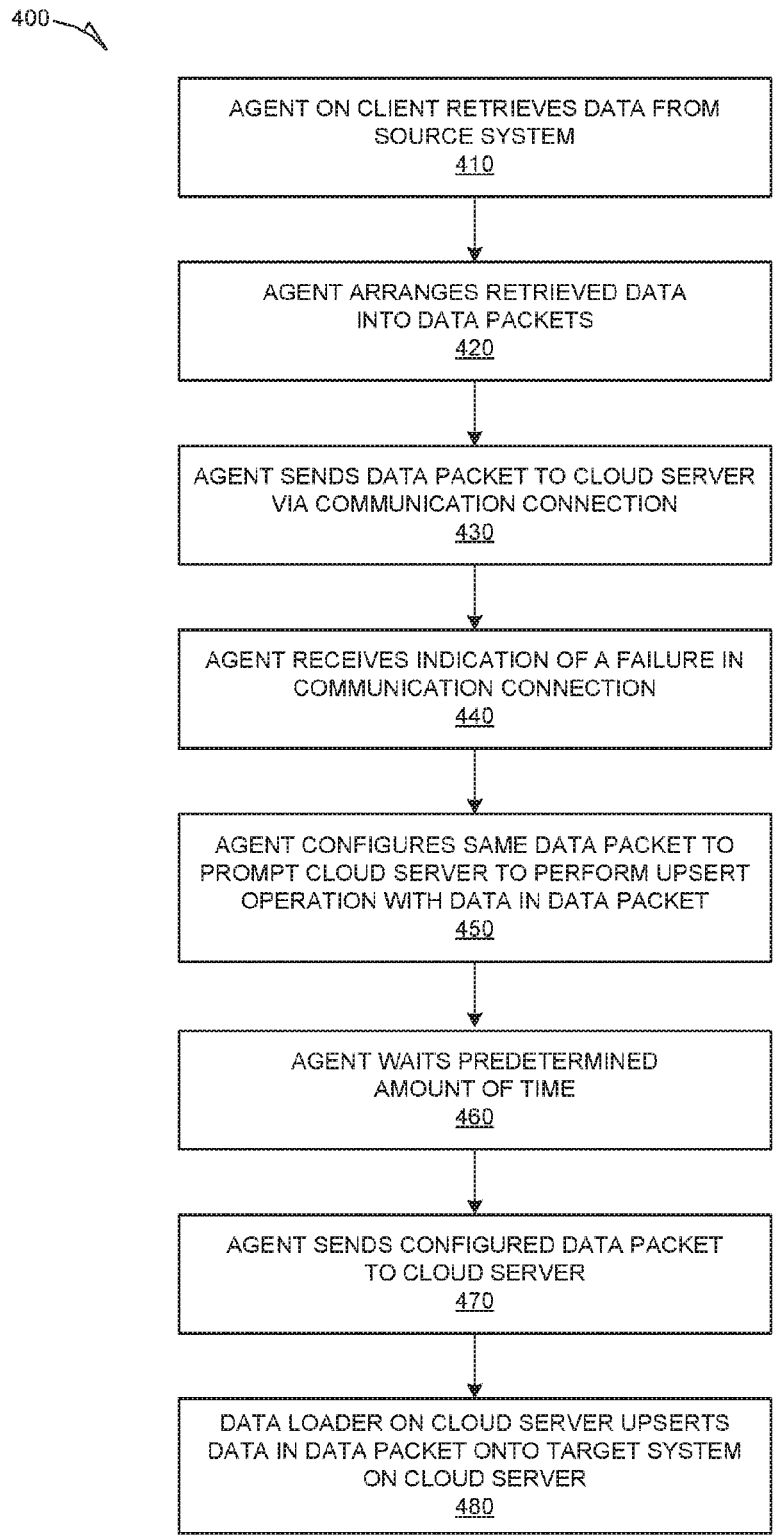
FIG. 4 is a flowchart illustrating an example method of data loading, in accordance with an example embodiment.

FIG. 4 is a flowchart illustrating an example embodiment of a data loading retry method 400. It is contemplated that any of the operations of method 400 may incorporate the features discussed above with respect to data loading retry system 300 in FIG. 3. At operation 410, an agent on a client system may retrieve data from a source system. At operation 420, the agent may arrange the retrieved data into multiple data packets. In some embodiments, the agent may arrange the retrieved data into multiple data packets by dividing the retrieved data into multiple data packets. At operation 430, the agent may send one of the data packets to a cloud server via a communication connection. At operation 440, the agent may receive an indication of a failure in the communication connection. At operation 450, in response to receiving the indication of the failure in the communication connection, the agent may configure the same data packet that it previously sent at operation 430 to prompt the cloud server to perform an upsert operation with data in the same data packet. In some embodiments, the agent may configure the same data packet to prompt the cloud server to perform an upsert operation by marking the data packet with a retry flag. The retry flag may be any flag that indicates that a repeat attempt is being made to load the same data packet. At operation 460, the agent may wait a predetermined amount of time. In some embodiments, this predetermined amount of time may be determined based on a maximum response or processing time for the cloud server. In some embodiments, this predetermined amount of time may be determined based on an average response or processing time for the cloud server. In some embodiments, this wait time may be calculated based on history of response and/or processing times. At operation 470, the agent may send the data packet configured to prompt the upsert operation to the cloud server. At operation 480, a data loader on the cloud server may upsert the data in the configured data packet onto a target system on the cloud server.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 5:
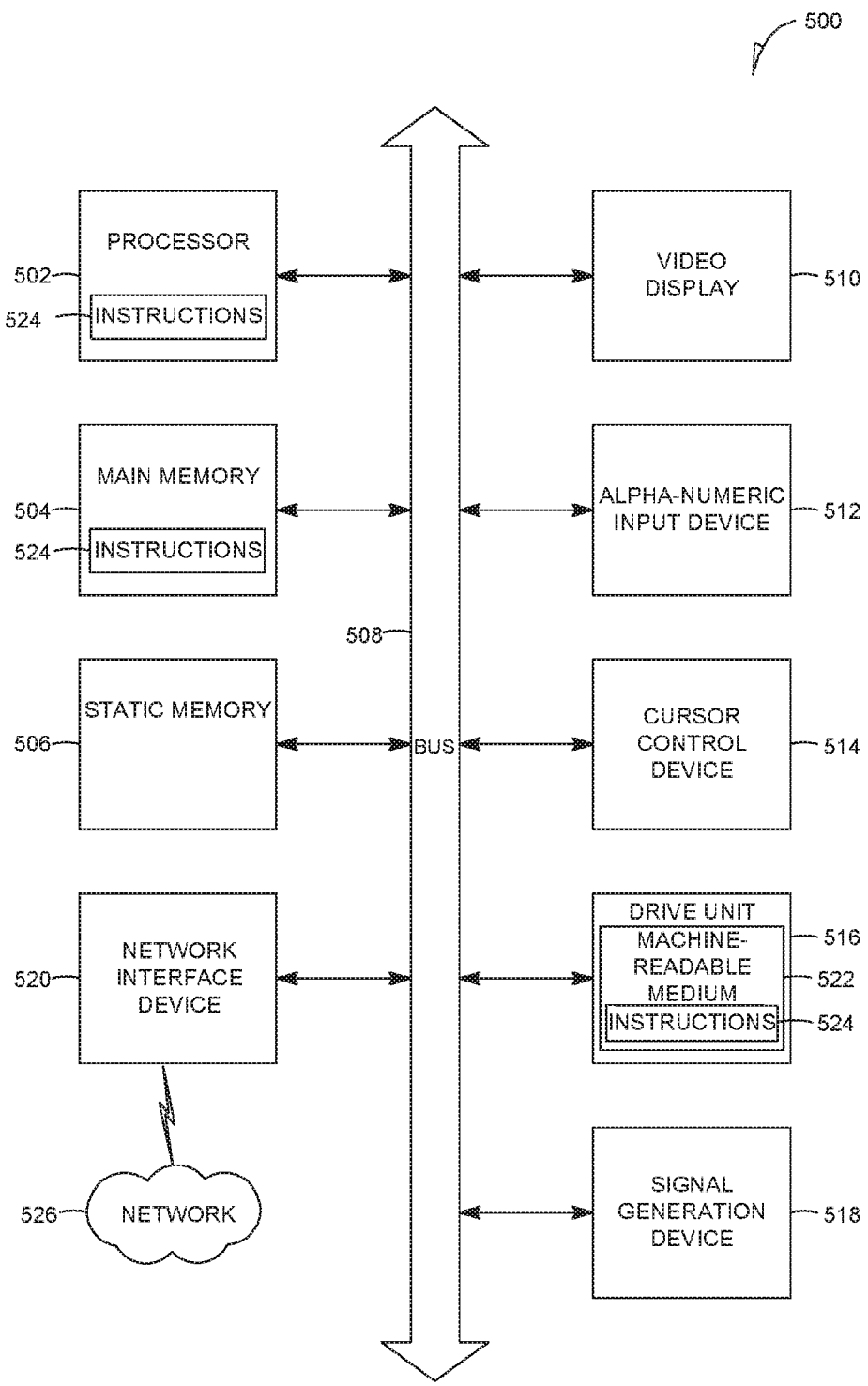
FIG. 5 is a block diagram of an example computer system on which methodologies described herein may be executed.

FIG. 5 is a block diagram of a machine in the example form of a computer system 500 within which instructions 524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a disk drive unit 516, a signal generation device 518 (e.g., a speaker) and a network interface device 520.

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving, by a server having a memory and at least one processor, a first data packet from a device via a communication network, the first data packet comprising first data;
   storing, by the server, the first data in one or more databases;
   receiving, by the server, a second data packet from the device, the second data packet comprising second data and being marked with a retry flag;
   determining, by the server, that the second data packet has been marked with the retry flag; and
   performing, by one of a plurality of data loaders on the server, an upsert operation with the second data in the second data packet based on the determining that the second data packet has been marked with the retry flag, each one of the plurality of data loaders being configured to load data onto the one or more databases.

2. The computer-implemented method of claim 1, further comprising:

receiving, by a load balancer on the server, the first data packet from the device;
determining, by the load balancer, a first one of the data loaders to send the received first data packet; and
sending, by the load balancer, the received first data packet to the determined first one of the data loaders.

3. The computer-implemented method of claim 2, further comprising:
   receiving, by the load balancer, the second data packet from the device;
   determining, by the load balancer, a second one of the data loaders to send the received second data packet, the second one of the data loaders being different from the first one of the data loaders; and
   sending, by the load balancer, the received second data packet to the determined second one of the data loaders.

4. The computer-implemented method of claim 2, wherein the determining, by the load balancer, of the first one of the data loaders to send the received first data packet is based on availability.

5. The computer-implemented method of claim 1, further comprising performing, by the server, an insert operation with the first data of the first data packet.

6. The computer-implemented method of claim 1, wherein the server comprises a cloud server and the device comprises a client device.

7. A system comprising:
   at least one processor; and
   a non-transitory machine-readable storage device storing instructions that, when executed, cause the at least one processor to perform operations comprising:
      receiving, by a server having a memory and at least one processor, a first data packet from a device via a communication network, the first data packet comprising first data;
      storing, by the server, the first data in one or more databases;
      receiving, by the server, a second data packet from the device, the data packet comprising second data and being marked with a retry flag;
      determining, by the server, that the second data packet has been marked with the retry flag; and
      performing, by one of a plurality of data loaders on the server, an upsert operation with the second data in the second data packet based on the determining that the second data packet has been marked with the retry flag, each one of the plurality of data loaders being configured to load data onto the one or more databases.

8. The system of claim 7, wherein the operations further comprise:
   receiving, by a load balancer on the server, the first data packet from the device;
   determining, by the load balancer, a first one of the data loaders to send the received first data packet; and
   sending, by the load balancer, the received first data packet to the determined first one of the data loaders.

9. The system of claim 8, wherein the operations further comprise:
   receiving, by the load balancer, the second data packet from the device;
   determining, by the load balancer, a second one of the data loaders to send the received second data packet, the second one of the data loaders being different from the first one of the data loaders; and
   sending, by the load balancer, the received second data packet to the determined second one of the data loaders.

10. The system of claim 8, wherein the determining, by the load balancer, of the first one of the data loaders to send the received first data packet is based on availability.

11. The system of claim 7, wherein the operations further comprise performing, by the server, an insert operation with the first data of the first data packet.

12. The system of claim 7, wherein the server comprises a cloud server and the device comprises a client device.

13. A non-transitory machine-readable storage device, tangibly embodying instructions that, when executed by at least one processor, causes the at least one processor to perform operations comprising:
    receiving a first data packet from a device via a communication network, the first data packet comprising first data;
    storing the first data in one or more databases;
    receiving a second data packet from the device, the data packet comprising second data and being marked with a retry flag;
    determining that the second data packet has been marked with the retry flag; and
    performing, by one of a plurality of data loaders on a server, an upsert operation with the second data in the second data packet based on the determining that the second data packet has been marked with the retry flag, each one of the plurality of data loaders being configured to load data onto the one or more databases.

14. The non-transitory machine-readable storage device of claim 13, wherein the operations further comprise:
    receiving the first data packet from the device;
    determining a first one of the data loaders to send the received first data packet; and
    sending the received first data packet to the determined first one of the data loaders.

15. The non-transitory machine-readable storage device of claim 14, wherein the operations further comprise:
    receiving the second data packet from the device;
    determining a second one of the data loaders to send the received second data packet, the second one of the data loaders being different from the first one of the data loaders; and
    sending the received second data packet to the determined second one of the data loaders.

16. The non-transitory machine-readable storage device of claim 14, wherein the determining of the first one of the data loaders to send the received first data packet is based on availability.

17. The non-transitory machine-readable storage device of claim 13, wherein the operations further comprise performing an insert operation with the first data of the first data packet.

* * * * *